July 14, 1936.  R. W. WALKER ET AL  2,047,500

APPARATUS FOR THE MEASUREMENT AND PROPORTIONING OF MATERIALS

Filed May 15, 1934  5 Sheets-Sheet 1

R. W. Walker
W. G. Jamieson
INVENTORS

By: Marks & Clerk
ATTYS.

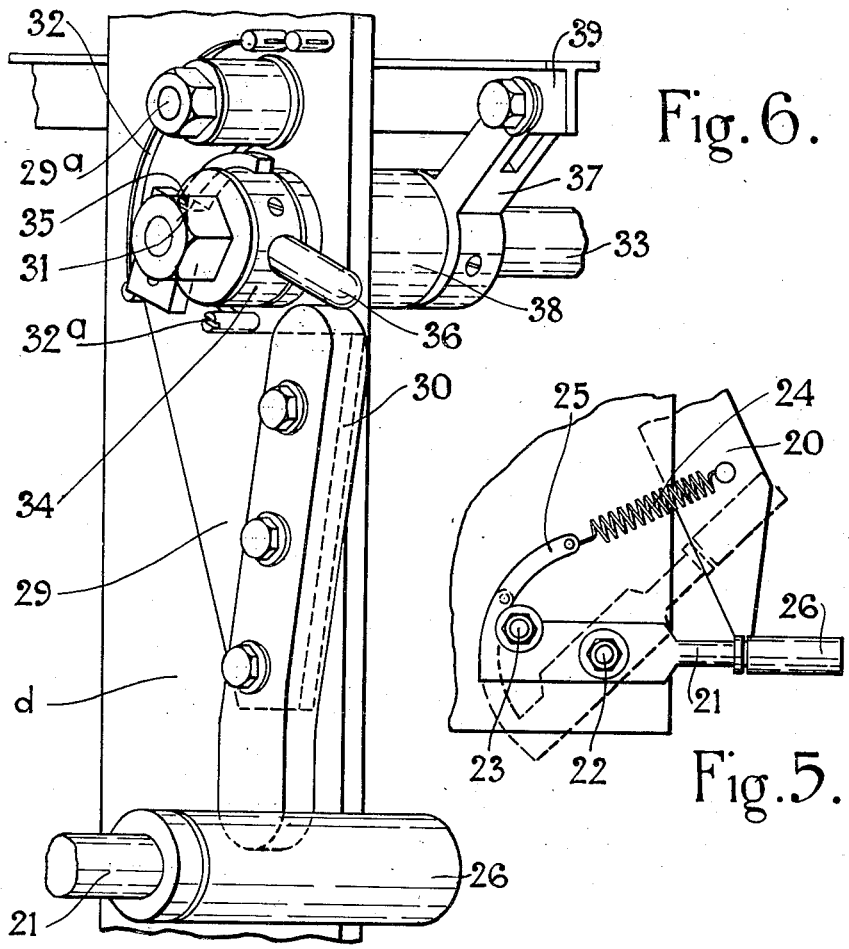
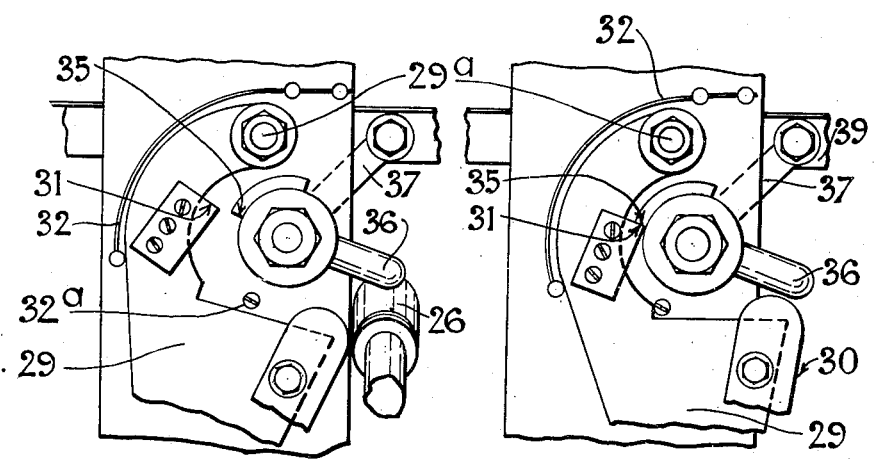

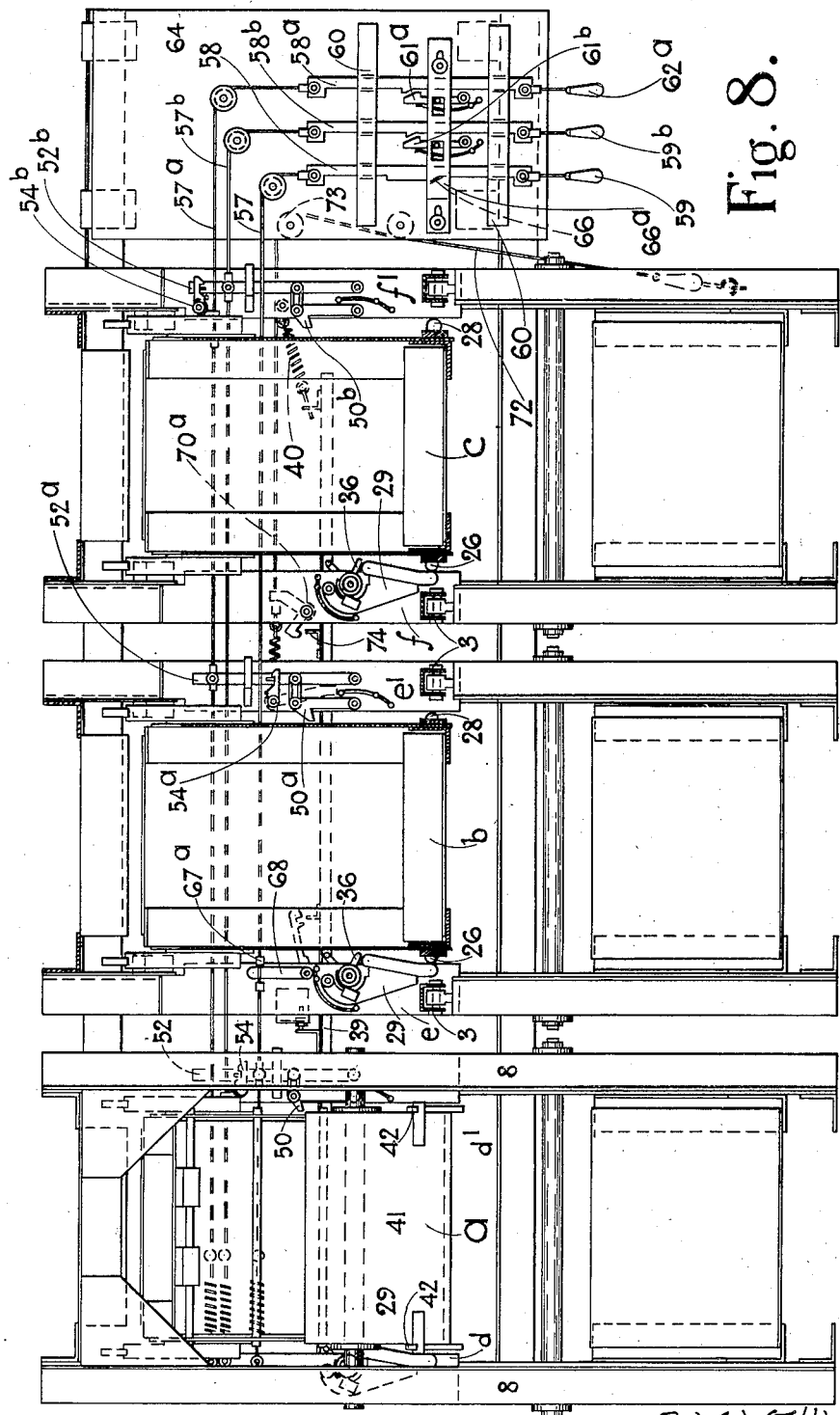

July 14, 1936.    R. W. WALKER ET AL    2,047,500
APPARATUS FOR THE MEASUREMENT AND PROPORTIONING OF MATERIALS
Filed May 15, 1934    5 Sheets-Sheet 4

July 14, 1936.   R. W. WALKER ET AL   2,047,500
APPARATUS FOR THE MEASUREMENT AND PROPORTIONING OF MATERIALS
Filed May 15, 1934   5 Sheets-Sheet 5

R. W. Walker
W. G. Jamieson
INVENTORS
By: Marks & Clerk
ATTYS.

Patented July 14, 1936

2,047,500

UNITED STATES PATENT OFFICE 2,047,500

APPARATUS FOR THE MEASUREMENT AND PROPORTIONING OF MATERIALS

Ronald William Walker and William George Jamieson, Glasgow, Scotland

Application May 15, 1934, Serial No. 725,796
In Great Britain May 31, 1933

8 Claims. (Cl. 249—14)

This invention has reference to apparatus for measuring and proportioning material so that batches formed of various ingredients in definite predetermined amounts can be automatically delivered therefrom, without manual control of measurements and the necessity of constant supervision and without the necessity of employing any motor to operate the apparatus.

Another object of the invention is to provide an apparatus for the purpose set forth whereby it will be impossible to obtain a batch therefrom which does not contain the exact number of ingredients, each of a definite predetermined quantity within the limits of accuracy of the apparatus.

A further object of the invention is to provide an apparatus for the purpose set forth which can measure off both large quantities and heavy materials and also small quantities and relatively light materials.

The invention has for a still further object to provide improved means to control the supply of material to receptacles by which the materials are measured.

A preferred embodiment of the invention is illustrated by way of example on the annexed five sheets of drawings wherein:—

Figure 5 is a side elevation of the interlocking mechanism operating device carried by each receptacle, and Figure 6 is a perspective view of the mechanism with which said device co-operates.

Figure 7 is an elevation of the interlocking mechanism, partly broken away, of two adjacent receptacles.

Figure 8 illustrates a front elevation of an apparatus in accordance with our invention, with means to control the discharge in a particular sequence, two of the receptacles being shown in section, the section being on the line 8—8, Figure 1.

Figure 9:
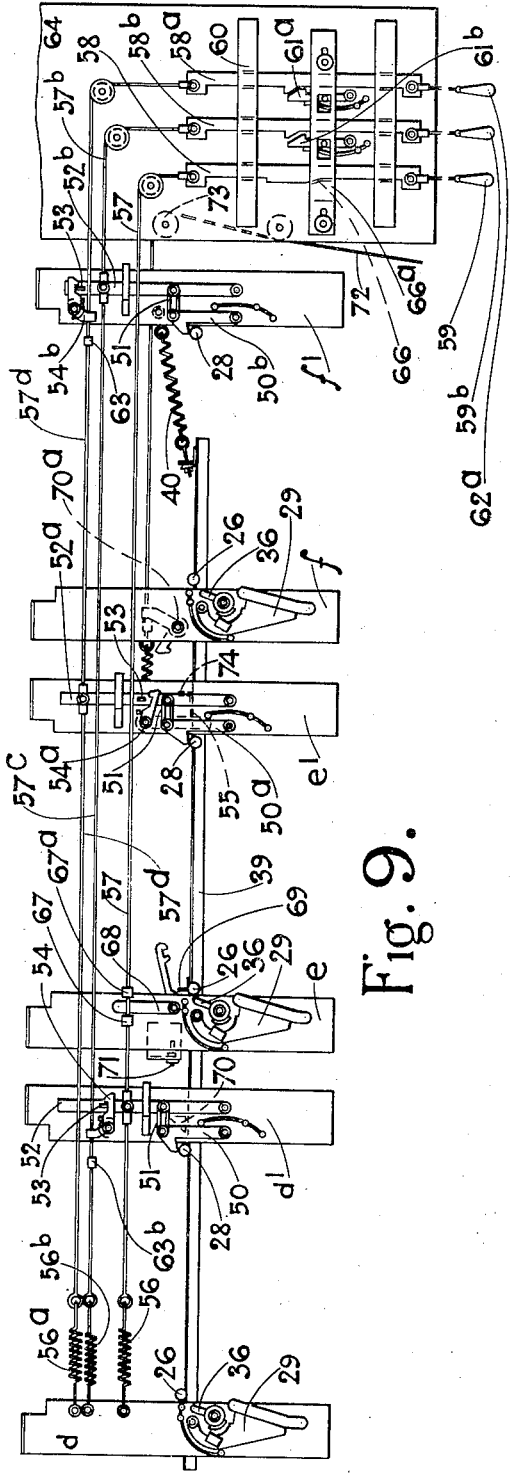
Figure 10:
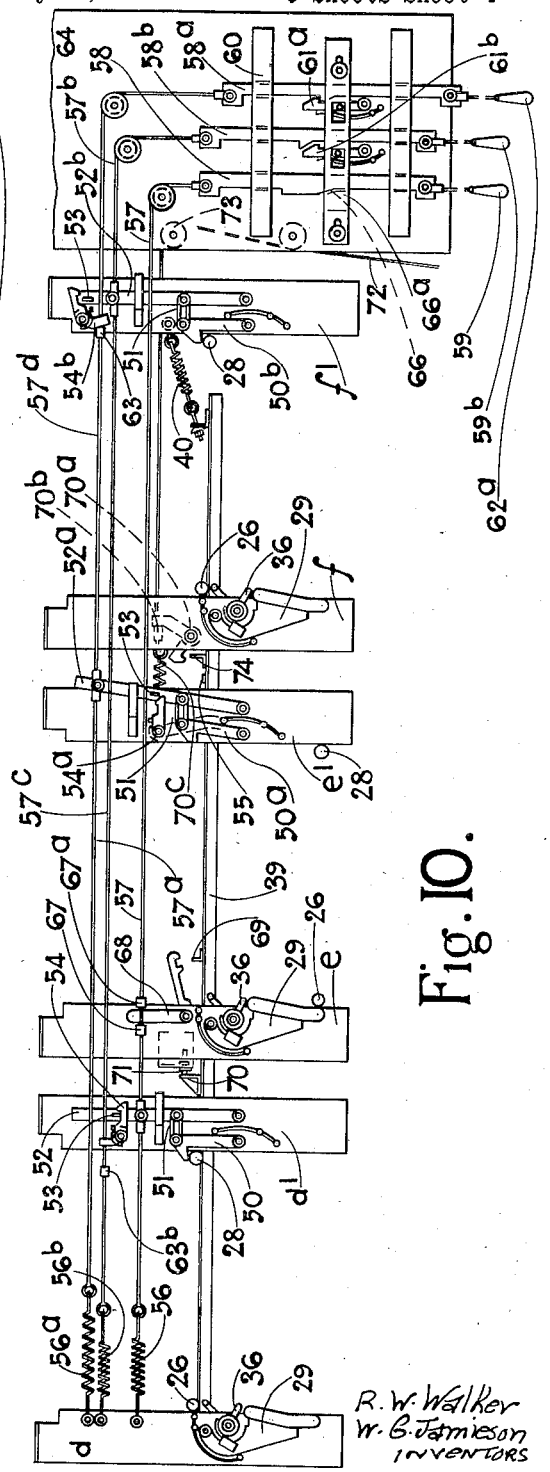
Figure 11:
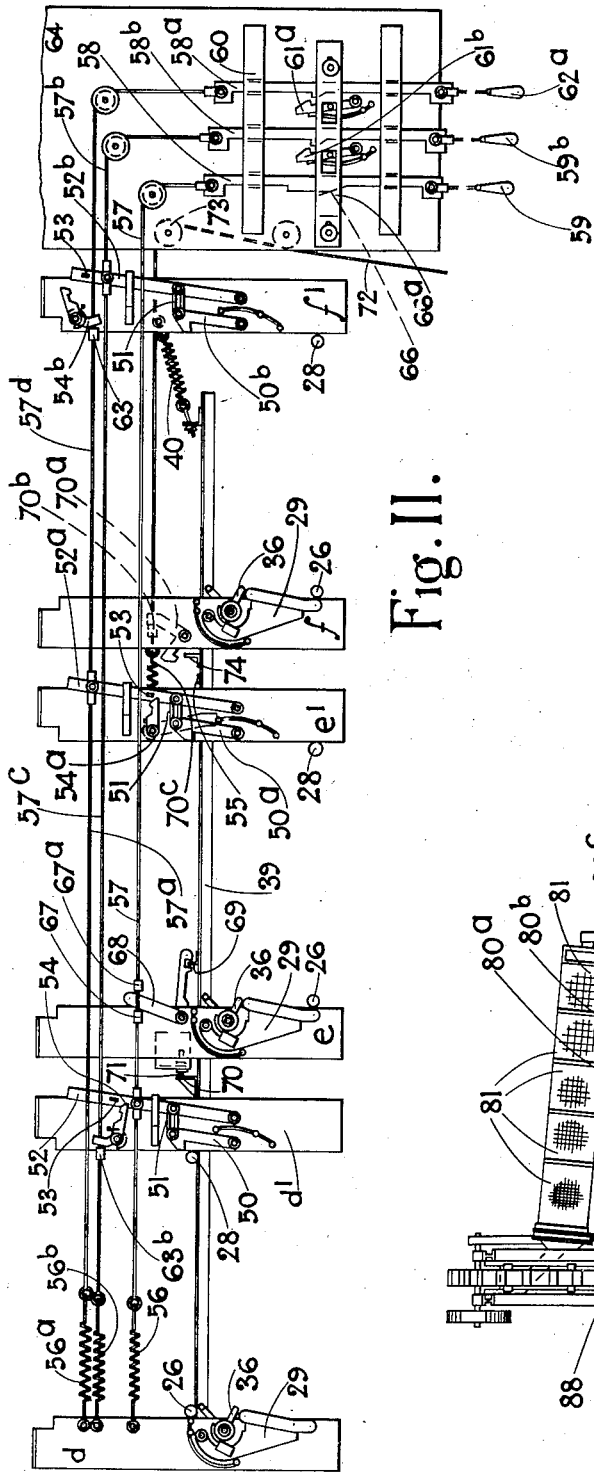

Figures 9, 10, and 11 show diagrammatically the sequence control mechanism in three different positions.

Figure 12:
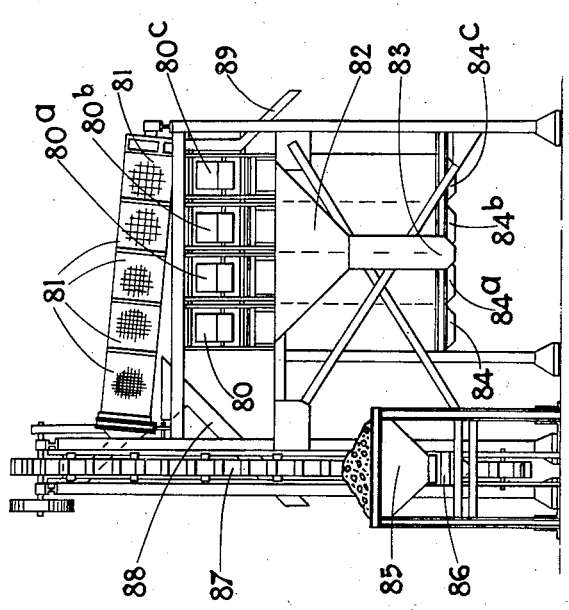

Figure 12 shows, in elevation, a general arrangement of four receptacles suitable for the purpose of "blending", or gradation of aggregates, where the control is applied to receptacles placed to receive material direct from sizing apparatus.

In the apparatus illustrated, except in Figure 12, there are three receptacles $a$, $b$, and $c$, but any other number may be provided to meet any particular requirements.

Each receptacle is carried by a shaft 1 journalled in bearings 2 carried by weigh-beams 3 which in turn are fulcrumed at 5 to convenient members 6 of the frame 8 by which the receptacles and the interlocking mechanism are supported.

Surmounting each receptacle is a fixed feed baffle plate 9, and an adjustable feed guide plate 10, by means of which the point of feed and the size of opening may be adjusted to suit different materials.

Figure 1:
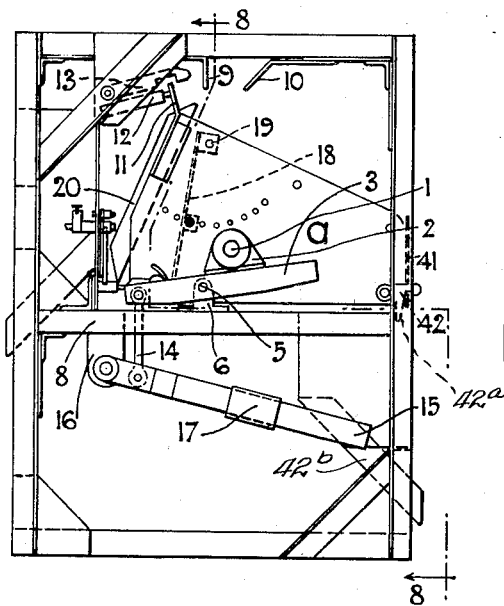
Figure 1 is a diagrammatic side elevation of a receptacle and associated mechanism, the receptacle being shown in its loading position.

Each receptacle is so positioned with respect to its shaft 1 that when empty it normally assumes the filling position with its bottom substantially horizontal as shown in Figure 1.

Each receptacle is provided with lugs 11, which, normally, and during the greater part of the loading period, rest against stops 12. Pivoted latches 13 are so positioned that the lugs 11 are positively held by them only on the first small tilting movement of the receptacle, under load, as will be hereinafter set forth.

The rear end of each weigh-beam 3 is connected by means of a link 14 to a lever 15 which is pivoted at one side of the link to a bracket 16 carried by the frame, and at the other side of the link carries an adjustable weight 17.

Any suitable type of weigh-beams and bearings may be employed; or weight-beams may be dispensed with, as is hereinafter referred to.

Each receptacle is provided with a plate 18 which is adjustable about a rod 19 by which the disposition of the material fed to the receptacles may be varied, bolts or other means locking the plates in their adjusted positions.

These plates 18 are to be severally adjusted so that just before each receptacle receives material sufficient to overcome the adjustable weights 17, the receptacle will lose balance, that is the receptacle will turn with the shaft 1 in the bearings 2 to a very limited extent. Lugs 11 will then cease to rest against the stops 12 and become held by the latches 13. Thereafter the receptacle overcomes the weight 17 and sinks sufficient to enable the lugs to clear the latches 13. It is to be clearly understood that where sufficient accuracy may be obtained without their use, weighbeams may be omitted, and measurement achieved solely by the overbalancing effect of the adjustable plate 18. If weigh-beams are dispensed with, the latches 13 are also omitted. By the provision of the weigh-beams, however, greater accuracy can be obtained.

On the rear side of each receptacle is a by-pass chute 20 the purpose of which will be hereafter set forth.

Secured to one side of each receptacle and near the bottom and rear thereof is a lever 21, see Figure 5, pivoted at 22 and normally held against a stop 23 by means of a helical spring 24. The said spring is attached at one end to the by-pass chute 20 and at the other end to a tail piece 25 carried by the lever. The protruding end of said lever carries a roller 26.

In a corresponding position on the other side of each receptacle is a pin also provided with a roller 28.

Secured to the rear of the supporting frame are three pairs of plates $d, d^1$; $e, e^1$; and $f, f^1$; see Figures 8 to 11, a receptacle being located between each pair.

Pivotally secured to each of the plates $d$, $e$ and $f$ at $29^a$ is a trigger lever 29 having a working edge 30 and an abutment 31; see Figure 6. Blade springs 32 secured to said plates $d$, $e$ and $f$ urge the trigger levers to the right against stops $32^a$.

Extending through each of the plates $d$, $e$ and $f$ are spindles 33, each of which has fast thereon a hub 34.

Each hub is provided with an abutment 35 and a stop pin 36.

Slotted lugs 37 are also secured to the spindles which are accommodated in suitable bearings 38, and the three lugs are rigidly interconnected by means of a connecting member 39. A helical spring 40 is attached to the right hand end of said member and plate $f^1$.

Assuming that it is desired that all three receptacles discharge simultaneously, and not in accordance with a prearranged sequence, the operation of the apparatus is as follows:—

The plates 18 are adjusted so that the disposition of the material in the receptacle will be such that each receptacle will lose balance when it has received a predetermined quantity of material, slightly less than the quantity required to actuate the weigh-beams. Further, the weights 17 are adjusted to such position that each receptacle will sink slightly just before it has received the required quota. It will be understood that the feed must be such that there will be no shock loading.

Figure 2:
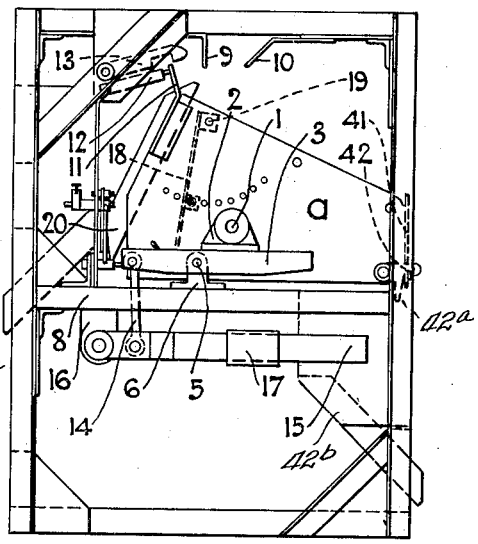
Figure 2 is a view similar to Figure 1 but showing the position of the receptacle and its associated mechanism just prior to the receptacle receiving its full quota.

The ingredients are fed through the openings between members 9 and 10, to the receptacles below. Just before each receptacle has received its quota it will overcome its counter-balance weight 17 and sink slightly, so that its lug 11 is clear of the latch 13, as shown in Figure 2.

Figure 3:
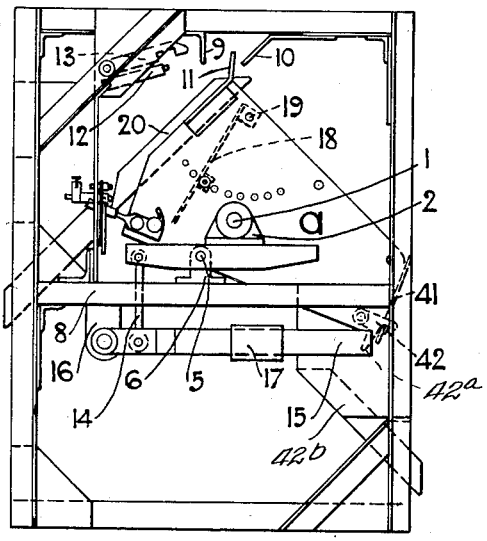
Figure 3 shows the position of the receptacle and associated mechanism when it has received its full quota.

When the receptacle receives material sufficient to actuate the weigh-beams, it will turn about its shaft 1, under the action of gravity, and its roller 26 co-operates with the working face 30 of the trigger lever 29, thereby turning said lever about its pivot, so as to disengage the abutment 31, carried by the lever from the abutment 35 carried by the hub 34. Thereafter the roller co-operates with the stop pin 36, and, if the spindle is not free to rotate, further movement of the roller 26, and therefore of the receptacle to which it is attached, is prevented. That is, the receptacle is held in the position shown in Figure 3, and thereby prevented from discharging its contents. Such receptacle has now received its quota.

The surplus material is then directed clear of the receptacle by means of its by-pass chute 20, which in turn may deliver the material to a bin, or to a chute, conveyor or the like.

It is to be clearly understood that the tilting of the receptacle may be employed to cause cessation of operation of a power-operated mechanical feeder, and that the subsequent return of the receptacle may be employed to cause recommencement of such feed. Hand operated feed may be employed.

As the spindles 33 are interconnected to each other by means of the lugs 37 and the member 39, it follows that if the abutment of one of the trigger levers is in engagement with the corresponding abutment of a hub, all three spindles are prevented from rotating.

But when each of the three receptacles has received its quota and operates the three trigger levers as aforesaid, the three stop pins 36 are moved upwardly in unison thereby permitting the three receptacles to simultaneously tilt to a further extent and discharge their quota.

Figure 4:
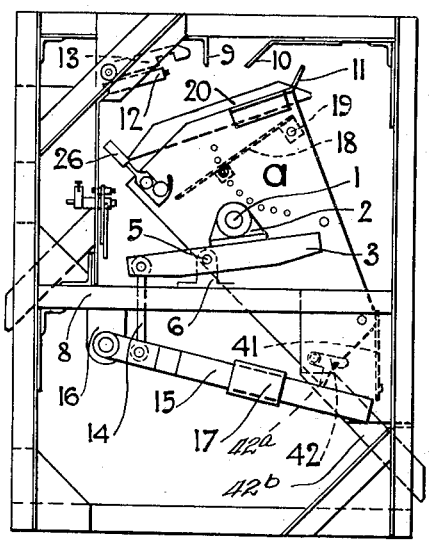
Figure 4 shows the position of the receptacle in the discharge position together with the associated mechanism.

If desired the front side 41 of each receptacle (see Figures 1 to 4) may be hinged at the top and held closed by means of catches 42, the catches being disengaged, to permit the said sides to swing open, by projections $42^a$ thereon co-operating with suitable fixtures for example with discharge chutes $42^b$ when the receptacles swing to the discharge position as shown in Figure 4. These doors are so suspended that they close by gravity as the receptacle returns to loading position.

Discharge doors may be omitted and we do not limit ourselves to any particular design of receptacle.

The rollers 26 and 28 bear against the edges of the plates $d$, $e$, and $f$, and $d^1$, $e^1$, and $f^1$ respectively, see Figures 8 to 11, and, when the receptacles are in movement thereby aid in steadying the receptacles.

Immediately the receptacles are discharged they swing back to their loading position, Figure 1, the position of their shafts being such that they assume such position automatically under the action of gravity when empty.

In the return movement the levers 21 turn about their pivots when contacting with the stop pins 36.

Should for any reason the supply of material to any of the receptacles be interrupted short of it receiving actuating load, such receptacle will fail to tilt and operate the interlocking mechanism. In consequence all of the receptacles are prevented from discharging.

In lieu of discharging the three receptacles simultaneously we may provide means whereby the receptacles, after all have received quota, can be discharged only in accordance with a predetermined sequence, as is requisite to some processes, for example in the manufacture of asphaltic road surfacing materials.

This can be effected by the following mechanism:— To the plates $d^1$, $e^1$, and $f^1$ are pivotally secured at their lower ends spring loaded latches 50, $50^a$, and $50^b$, each of which is connected by a slotted link 51 to levers 52, $52^a$, and $52^b$, respectively, see Figures 8, 9, 10, and 11.

It will be seen that after the interlocking mechanism has been released the three receptacles are still prevented from discharging by means of the latches 50, 50ᵃ, and 50ᵇ, which engage with the rollers 28.

Further, as clearly shown in Figure 9, while the rollers 26 carried by the receptacles *a* and *c* are clear of the stop pins 36, that carried by receptacle *b* bears against its co-operating stop pin and prevents the connecting member 39 moving to the right under the action of the spring 40.

Each of said levers is provided with a lug 53 which lugs are normally engaged by the notched arms of spring loaded bell crank levers 54, 54ᵃ, and 54ᵇ fulcrumed to the said plates *d*¹, *e*¹, and *f*¹ respectively.

The other arm of bell crank lever 54ᵃ is located in the path of a striker 55 carried by the connecting member 39.

The upper end of lever 52ᵃ is connected to a wire or the like 57ᵃ attached to a spring 56ᵃ connected to the plate *d*, and is also connected by means of wire or the like 57ᵈ passing over a suitable guide pulley to a notched bar 58ᵃ slidably held in position on a plate 64 by means of bar guides 60. A handle 62ᵃ is provided to pull the bar 58ᵃ.

A spring urged latch 61ᵃ is arranged to engage with the notch of said bar 58ᵃ when the latter is pulled downwardly.

When the said interlocking means is operated by the three receptacles the connecting member 39 is moved to the left and the striker 55 carried thereby turns the spring influenced bell crank lever 54ᵃ about its fulcrum thereby moving the notched arm thereof clear of the lug 53 of the lever 52ᵃ, see Figure 9. Then, and not till then can the bar 58ᵃ be pulled effectively to turn lever 52ᵃ about its pivot and, through the slotted link 51, pull the latch 50ᵃ clear of the roller 28 of the receptacle *b*, thereby permitting said receptacle to discharge.

When this is effected the connecting member 39 is permitted to move to its normal position under the action of the spring 40. Such return movement of member 39 is restricted by a member 70 carried thereby contacting with a stop 71.

When the notched bar 58ᵃ is pulled as aforesaid a striker 63 carried by the wire or the like 57ᵈ actuates the spring influenced bell crank lever 54ᵇ which is consequently turned about its fulcrum so as to disengage its notched arm from the lug 53 of lever 52ᵇ. This lever is attached by means of a wire or like connection 57ᶜ to a spring 56ᵇ which is attached to the plate *d*, and has also attached thereto a wire or the like 57ᵇ which passes over a suitable guide pulley and is attached to a notched bar 58ᵇ. The latter is capable of sliding on the plate 64 and has secured thereto a handle 59ᵇ.

When the bell crank 54ᵇ is turned about its fulcrum, see Figure 10, the bar 58ᵇ can be pulled effectively to turn lever 52ᵇ about its pivot and, through the slotted link 51, move the latch 50ᵇ clear of the roller 28 of the receptacle *c* which is thereby permitted to discharge.

That is, handle 59ᵇ can be pulled to permit receptacle *c* to discharge its contents only after handle 62ᵃ has been pulled to permit of the discharge of receptacle *b*.

When the notched bar 58ᵇ is pulled the spring loaded latch 61ᵇ engages with its notch and retains it in said position.

The wire or the like 57ᶜ has secured thereto a striker 63ᵇ which, when bar 58ᵇ is pulled as aforesaid, actuates the bell crank 54 so that its notched arm then clears the lug 53 carried by the lever 52.

The lever 52 is attached by means of a wire or like connection to a spring 56 which is attached to the plate *d*, and has also attached thereto a wire or the like 57 which passes over a suitable guide pulley and is attached to a bar 58. The latter is capable of sliding on the plate 64, and has attached thereto a handle 59. When the latter is pulled, which can only be done with effect after the bell crank 54 has been turned about its fulcrum as aforesaid lever 52 is turned about its pivot and withdraws latch 50 thereby permitting receptacle *a* to discharge, see Figure 11.

It will thus be seen that the receptacles can only be discharged in the order *b, c, a*, but it will be apparent that by rearranging the mechanism they may be discharged in any other desired sequence.

When bars 58ᵃ and 58ᵇ are pulled as aforesaid they are retained by means of the spring loaded latches 61ᵃ and 61ᵇ respectively, and the notched arms of the bell crank levers controlled thereby are thereby held in a disengaged position. The bar 58 can then be effectively pulled at the convenience of the operator.

When bar 58 is pulled an inclined face 66 formed on the side thereof co-operates with a sliding bar 66ᵃ mounted on the plate 64. Said bar is thereby moved to the left and by engaging pins carried by the latches 61ᵃ and 61ᵇ moves the latches clear of the bars 58ᵃ and 58ᵇ, which resume their normal positions under the action of the springs 56ᵃ and 56ᵇ. The bell crank levers 54 and 54ᵇ being spring loaded likewise resume their normal position. Also when bar 58 is pulled a stop 67 carried by the wire or the like 57 co-operates with one arm of a bell crank lever 68 fulcrumed on plate *e* so that the other arm thereof, which is notched, engages with a bracket 69 carried by the connecting member 39, thereby locking said member against longitudinal movement.

Therefore the receptacle *a* is prevented from discharging out of proper sequence, and until the handle 59 is released to permit a second stop 67ᵃ, likewise carried by the wire or the like 57, to co-operate with the bell crank 68 and turn it about its fulcrum to release the bracket 69, and thus free the member 39, no receptacle can be discharged. By such provisions as the above it is impossible to discharge any of the receptacles, except in the predetermined sequence, by holding or manipulating the three handles or any one thereof.

Said sequence control mechanism may be held out of operation by any suitable means so as to permit the receptacles to discharge simultaneously and automatically on all receiving their quota.

It may be here mentioned that simultaneous discharge consequent upon all receptacles having titled is particularly applicable to the blending of materials, notably to the gradation of aggregates.

It may be desirable to discharge the three receptacles simultaneously, but under control as may be suitable to the operation of a concrete mixing machine or the like.

To meet such contingency we provide a spring influenced bell crank lever 70ᵃ fulcrumed to the plate *f*, one arm of said lever being notched. The other arm of said lever lies in the path of a striker 70$^b$ carried by a wire 72 which is connected at one end to a spring 70$^c$ fixed to the plate e$^1$, and the other end of said wire passes over a pulley 73. The notched arm of said lever is adapted to engage with a bracket 74 secured to the connecting member 39.

When the receptacles are to discharge automatically on all receiving their quota and also when the sequence discharge mechanism is in operation, the bell crank lever 70$^a$ is retained in its inoperative position by attaching the end of the wire or the like 72 to a hook or suitable fixture. But when the receptacles are to be discharged simultaneously under the control of the operator the wire or the like is freed from the hook or other fixture. The notched arm of the bell crank 70$^a$ then engages with the bracket 74 and positively prevents the connecting member moving to the left. Thus when the receptacles have received their quota they are still prevented from discharging until the operator pulls the wire or the like 72 thereby releasing the notched arm of the bell crank 70$^a$ from the bracket 74 which in turn permits the connecting member 39 to move to the left and all receptacles to discharge simultaneously.

An alternative arrangement consists in retaining the spring loaded bell crank levers 54, 54$^a$, and 54$^b$ in their inoperative positions and interconnecting the three handles so that the three latches 50, 50$^a$, and 50$^b$ can be simultaneously withdrawn.

It is to be clearly understood that one or more of the bars 50, 50$^a$, and 50$^b$ may be extended to a convenient moving part of another apparatus associated with some subsequent process.

Although only three receptacles are shown in the drawings it will be understood that any other number may be employed and where sequence discharge control mechanism is provided it may be rearranged to permit of the receptacles being discharged in any desired sequence.

In the apparatus shown in Figure 12 a plurality receptacles 80, 80$^a$, 80$^b$, and 80$^c$ is surmounted by a set of trommels or revolving screens 81. Below and in front of the receptacles is a hopper 82 which communicates with a delivery chute 83. At the rear of each receptacle is a bin 84, 84$^a$, 84$^b$, and 84$^c$.

85 is a supply bin for the raw material, which bin delivers the material through a feeder 86 into a bucket conveyor 87 by which the material is delivered to the upper end of the trommels.

The undersized material falls through the first trommel and is diverted clear of the apparatus by a delivery chute 88.

The trommels size the material in known manner so that each receptacle receives a quota of material of a definite size, material too large being discharged clear of the apparatus by the chute 89.

When all the receptacles have received their quota they discharge into the chutes 82 and 83 either simultaneously or at the option of an operator as above set forth, and the blended material removed from the chute 83.

Immediately a receptacle tilts the feed stream thereto is diverted by its by-pass chute into corresponding bins located at the rear of the apparatus. The material may be removed from said bins as and when desired.

By placing the control mechanism at the front of the apparatus and the actuating rollers at the front of the receptacles each receptacle may be arranged to discharge immediately it receives its quota but will be prevented from assuming the charging position and recharging until each has discharged. Thereon by operating the interlocking mechanism all receptacles will assume the charging position either automatically or by sequence control mechanism, or partly automatically and partly under the control of the operator.

In lieu of mechanically operated interlocking mechanism we may provide electrically or fluid operated interlocking means.

What we claim is:—

1. An apparatus for the purpose set forth comprising a plurality of receptacles, one to receive each ingredient of the material fed thereto, and each arranged to discharge its contents solely under the action of gravity and mechanical interlocking means operated solely by the movement of each receptacle under gravity when it has received its predetermined quantity of material and by which all of the receptacles are prevented from discharging until all have received their predetermined quantities of material, whereupon said interlocking means is operated to free all of the receptacles which thereupon discharge their contents solely by gravity.

2. An apparatus for the purpose set forth comprising a plurality of receptacles each mounted to tilt under gravity when it has received a predetermined quantity of material, and mechanical interlocking means operated solely by the movement of each receptacle under gravity and by which the receptacles are all prevented from discharging until the interlocking means is operated by the receptacle last to receive its predetermined quantity whereupon the interlocking means is operated to permit all of the receptacles to tilt under the action of gravity and discharge their contents.

3. An apparatus for the purpose set forth comprising a plurality of receptacles each arranged to tilt on receiving a predetermined quantity of material, a plurality of feed sheets by which the material is delivered to said receptacles, by-pass chutes associated with said receptacles and by which the feed from the feed-chutes is by-passed consequent upon each receptacle tilting, and interlocking means operated by the movement of each receptacle and by which the receptacles are prevented from discharging until operated by the receptacle last to receive its predetermined quantity of material whereupon the interlocking means is operated to permit all the receptacles to discharge.

4. An apparatus for the purpose set forth comprising a plurality of receptacles, weigh-beams pivotally supporting each receptacle in such manner that each receptacle will tilt on receiving a predetermined quantity of material, interlocking means by which all of the receptacles are prevented from discharging until each has received its predetermined quantity of material, and means associated with the receptacles by which the feed stream to each receptacle is diverted therefrom when the receptacles receive a predetermined quantity of material and the weigh-beam moves under the weight of its receptacle and contents.

5. An apparatus for the purpose set forth comprising a plurality of receptacles, one to receive each ingredient of the material fed thereto, arranged to tilt and discharge their contents under gravity and mechanical interlocking means governing the discharge of all the receptacles comprising a connecting member, trigger mechanism, one for each receptacle, arranged to retain said member, and mechanical means carried by each receptacle to operate its trigger mechanism on receiving a predetermined quantity of material, the said member being operated mechanically by the receptacles when each has received its predetermined quantity of material, all the receptacles being then freed to discharge.

6. An apparatus for the purpose set forth comprising a plurality of receptacles, weigh-beams by which said receptacles are pivotally supported in such manner that each automatically assumes the charging position when empty and moves on receiving a predetermined quantity of material, means to prevent each receptacle tilting beyond a limited extent on receiving a predetermined quantity of material, a by-pass chute carried by each receptacle and by which the feed thereto is diverted therefrom when moved to such limited extent, and interlocking means operated by each receptacle on moving and by which the receptacles are prevented from discharging until each has received its predetermined quantity of material.

7. An apparatus for the purpose set forth comprising a plurality of receptacles, one to receive each ingredient of the material fed thereto, and each arranged to discharge its contents solely under the action of gravity, interlocking means operated by the movement of each receptacle on receiving a predetermined quantity of material and by which all of the receptacles are prevented from discharging until each has received a predetermined quantity of material whereon said interlocking means is operated to release all of the receptacles, and further control means by which the receptacles are prevented from discharging until a further operation is effected.

8. An apparatus for the purpose set forth comprising a plurality of receptacles, one to receive each ingredient of the material fed thereto, and each arranged to discharge its contents solely under the action of gravity, interlocking means operated by the movement of each receptacle on receiving a predetermined quantity of material and by which all of the receptacles are prevented from discharging until each has received a predetermined quantity of material whereon said interlocking means is operated to release all of the receptacles, and further interlocking mechanism by which the discharge of the receptacles can only take place according to a predetermined sequence.

RONALD WILLIAM WALKER.
WILLIAM GEORGE JAMIESON.